United States Patent
Symanow et al.

(10) Patent No.: US 11,472,397 B2
(45) Date of Patent: Oct. 18, 2022

(54) TRACTION-BATTERY CONTROL IN HYBRID POWERTRAIN

(71) Applicant: Ford Global Technologies, LLC, Dearborn, MI (US)

(72) Inventors: David Anthony Symanow, Plymouth, MI (US); Prasad Venkiteswaran, Canton, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 15/927,135

(22) Filed: Mar. 21, 2018

(65) Prior Publication Data

US 2019/0291712 A1    Sep. 26, 2019

(51) Int. Cl.
| | |
|---|---|
| *B60W 20/13* | (2016.01) |
| *B60W 10/06* | (2006.01) |
| *B60W 10/08* | (2006.01) |
| *B60W 10/26* | (2006.01) |
| *B60K 6/44* | (2007.10) |
| *B60K 6/48* | (2007.10) |
| *B60L 3/12* | (2006.01) |
| *B60W 20/11* | (2016.01) |
| *B60K 6/46* | (2007.10) |
| *B60L 58/13* | (2019.01) |

(52) U.S. Cl.
CPC .............. *B60W 20/13* (2016.01); *B60K 6/44* (2013.01); *B60K 6/46* (2013.01); *B60K 6/48* (2013.01); *B60L 3/12* (2013.01); *B60L 58/13* (2019.02); *B60W 10/06* (2013.01); *B60W 10/08* (2013.01); *B60W 10/26* (2013.01); *B60W 20/11* (2016.01); *B60W 2510/244* (2013.01)

(58) Field of Classification Search
CPC ...... B60W 20/13; B60W 20/11; B60W 10/06; B60W 10/08; B60W 10/26; B60W 2510/244; B60L 58/13; B60L 3/12; B60K 6/44; B60K 6/46; B60K 6/48
See application file for complete search history.

(56) References Cited

U.S. PATENT DOCUMENTS

| | | | |
|---|---|---|---|
| 6,434,469 B1 | 8/2002 | Shimizu et al. | |
| 7,559,355 B2 | 7/2009 | Severinsky et al. | |
| 8,138,720 B2 * | 3/2012 | Snyder | B60L 50/61 |
| | | | 320/127 |

(Continued)

FOREIGN PATENT DOCUMENTS

| | | |
|---|---|---|
| CN | 101708694 B | 1/2014 |
| JP | 5424146 B2 | 2/2014 |

*Primary Examiner* — Thomas Ingram
*Assistant Examiner* — Omar K Morsy
(74) *Attorney, Agent, or Firm* — Frank A. MacKenzie; Bejin Bieneman PLC

(57) ABSTRACT

A computer includes a processor and a memory storing processor-executable instructions. The processor is programmed to prevent a traction battery from providing power to a vehicle powertrain below a charge threshold, and then, upon one of (a) receiving an acceleration demand above an acceleration threshold and (b) predicting that a planned maneuver classified as high acceleration will occur within a time threshold, permit the traction battery to provide power to the vehicle powertrain below the charge threshold.

19 Claims, 3 Drawing Sheets

(56) References Cited

U.S. PATENT DOCUMENTS

| | | | |
|---|---|---|---|
| 8,436,585 B2* | 5/2013 | Yano | B60L 58/14 |
| | | | 320/132 |
| RE45,431 E * | 3/2015 | King | H02J 7/0024 |
| | | | 307/10.1 |
| 9,428,060 B2 | 8/2016 | Lasson et al. | |
| 9,469,289 B2* | 10/2016 | Yu | B60W 20/12 |
| 2002/0142884 A1* | 10/2002 | Kitajima | B60K 6/485 |
| | | | 477/2 |
| 2007/0112494 A1* | 5/2007 | Naik | B60K 31/0008 |
| | | | 701/55 |
| 2015/0084414 A1 | 3/2015 | Bissontz | |
| 2015/0344036 A1* | 12/2015 | Kristinsson | B60W 20/12 |
| | | | 701/22 |
| 2017/0334427 A1* | 11/2017 | Butcher | B60W 10/10 |
| 2018/0208175 A1* | 7/2018 | Zhang | B60W 10/08 |

* cited by examiner

TRACTION-BATTERY CONTROL IN HYBRID POWERTRAIN

BACKGROUND

Hybrid-electric vehicles typically rely on two energy sources, an internal-combustion engine and a battery with a motor/generator. Hybrid-electric vehicles typically rely on the combination of torque from the engine and torque from the motor to achieve driving dynamics acceptable to occupants, e.g., accelerating sufficiently quickly from a standstill.

Autonomous and semi-autonomous vehicles include additional electronics compared to nonautonomous vehicles. The additional electronics can impose significant electrical loads on the electrical system of the vehicle. In a hybrid-electric vehicle, these electrical loads can significantly degrade drive performance, in particular, acceleration. Slower acceleration and worsened drive performance may require the autonomous operation to be designed to detect traffic and plan maneuvers further in advance because of a slowed ability to react.

DETAILED DESCRIPTION

Figure 1:
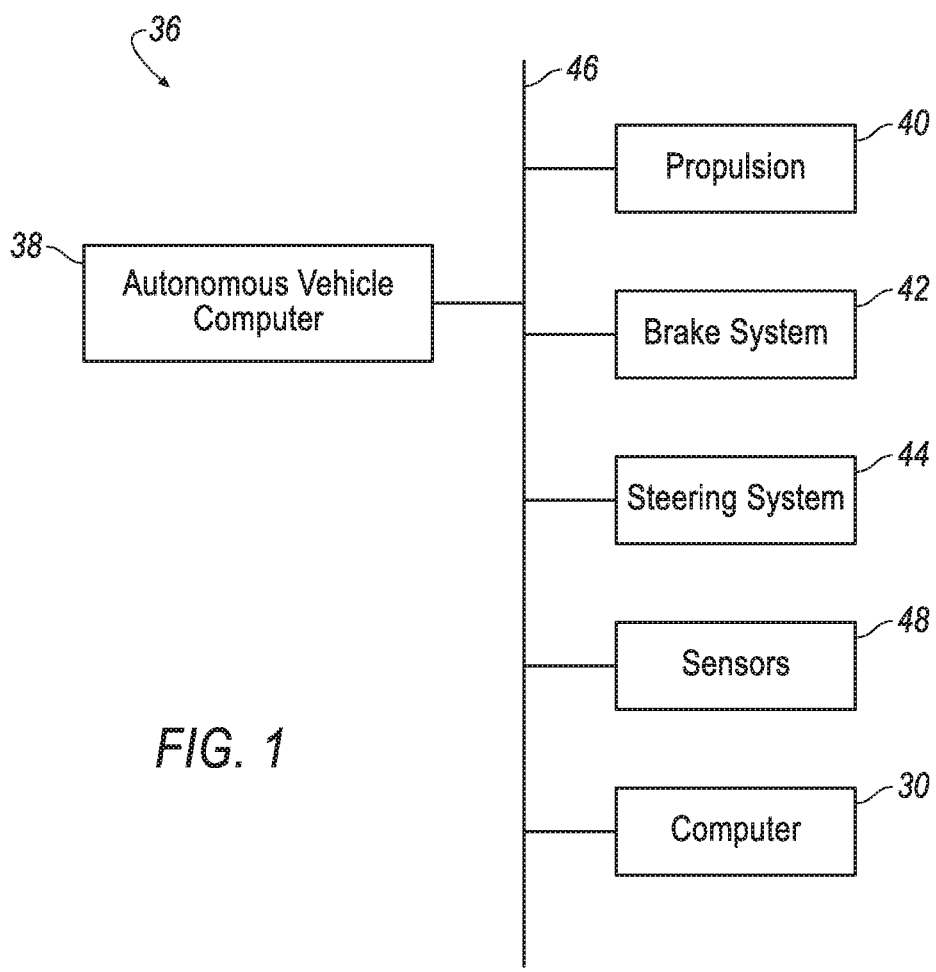
FIG. 1 is a block diagram of an example vehicle.

The implementation of a power system described herein can provide improved drive performance for a hybrid-electric vehicle despite the electrical loads from, e.g., autonomous-vehicle electronics. A computer is programmed to prevent a traction battery from discharging to a powertrain in situations in which the traction battery typically otherwise would have discharged in a hybrid-electric vehicle, and the computer is also programmed to permit the traction battery to discharge in situations in which the extra power would most improve the drive performance. The power system provides improved drive performance while still sufficiently powering the autonomous-vehicle electronics.

A computer includes a processor and a memory storing processor-executable instructions. The processor is programmed to prevent a traction battery from providing power to a vehicle powertrain below a charge threshold; and then, upon one of (a) receiving an acceleration demand above an acceleration threshold and (b) predicting that a planned maneuver classified as high acceleration will occur within a time threshold, permit the traction battery to provide power to the vehicle powertrain below the charge threshold.

The processor may be further programmed to instruct a generator to charge the traction battery in response to a state of charge of the traction battery falling below the charge threshold. The charge threshold may be a first charge threshold, and the processor may be further programmed to, after instructing the generator to charge the traction battery, instruct the generator to cease charging the traction battery in response to the state of charge of the traction battery increasing above a second charge threshold.

The processor may be further programmed to prevent the generator from starting to charge the traction battery in response to the state of charge of the traction battery being above the charge threshold.

The processor may be further programmed to instruct an autonomous-driving computer of the vehicle to put the vehicle in a minimal risk condition in response to a state of charge of the traction battery falling below the charge threshold and a generator being unavailable. Putting the vehicle in a minimal risk condition may be driving the vehicle to a roadside.

A method includes preventing a traction battery from providing power to a vehicle powertrain below a charge threshold; and then, upon one of (a) receiving an acceleration demand above an acceleration threshold and (b) predicting that a planned maneuver classified as high acceleration will occur within a time threshold, permitting the traction battery to provide power to the vehicle powertrain below the charge threshold.

The method may further include instructing a generator to charge the traction battery in response to a state of charge of the traction battery falling below the charge threshold. The charge threshold may be a first charge threshold, and the method may further include, after instructing the generator to charge the traction battery, instructing the generator to cease charging the traction battery in response to the state of charge of the traction battery increasing above a second charge threshold.

The method may further include preventing the generator from starting to charge the traction battery in response to the state of charge of the traction battery being above the charge threshold.

The method may further include instructing an autonomous-driving computer of the vehicle to put the vehicle in a minimal risk condition in response to a state of charge of the traction battery falling below the charge threshold and a generator being unavailable. Putting the vehicle in a minimal risk condition may be driving the vehicle to a roadside.

A vehicle includes a vehicle powertrain, a traction battery electrically coupled to the vehicle powertrain, and a computer. The computer is programmed to prevent the traction battery from providing power to the vehicle powertrain below a charge threshold; and then, upon one of (a) detecting an acceleration demand above an acceleration threshold and (b) predicting that a planned maneuver classified as high acceleration will occur within a time threshold, permit the traction battery to provide power to the vehicle powertrain below the charge threshold.

The vehicle may further include a generator electrically coupled to the traction battery, and the computer may be programmed to instruct the generator to charge the traction battery in response to a state of charge of the traction battery falling below the charge threshold. The charge threshold may be a first charge threshold, and the computer may be further programmed to, after instructing the generator to charge the traction battery, instruct the generator to cease charging the traction battery in response to the state of charge of the traction battery increasing above a second charge threshold.

The computer may be further programmed to prevent the generator from starting to charge the traction battery in response to the state of charge of the traction battery being above the charge threshold.

The vehicle may further include a generator electrically coupled to the traction battery, and an autonomous-driving computer communicatively coupled to the computer. The computer may be programmed to instruct the autonomous-driving computer to put the vehicle in a minimal risk condition in response to a state of charge of the traction battery falling below the charge threshold and the generator being unavailable. Putting the vehicle in a minimal risk condition may be driving the vehicle to a roadside.

A computer 30 includes a processor and a memory storing processor-executable instructions. The processor is programmed to prevent a traction battery 32 from providing power to a powertrain 34 of a vehicle 36 below a first charge threshold, and then, upon one of (a) receiving an acceleration demand above an acceleration threshold and (b) predicting that a planned maneuver classified as high acceleration will occur within a time threshold, permit the traction battery 32 to provide power to the powertrain 34 below the first charge threshold.

With reference to FIG. 1, the vehicle 36 may be an autonomous or semi-autonomous vehicle. An autonomous-vehicle computer 38 can be programmed to operate the vehicle 36 independently of the intervention of a human driver, completely or to a lesser degree. The autonomous-vehicle computer 38 may be programmed to operate a propulsion 40, brake system 42, steering system 44, and/or other vehicle systems. For the purposes of this disclosure, autonomous operation means the autonomous-vehicle computer 38 controls the propulsion 40, brake system 42, and steering system 44 without input from a human driver; semi-autonomous operation means the autonomous-vehicle computer 38 controls one or two of the propulsion 40, brake system 42, and steering system 44 and a human driver controls the remainder; and nonautonomous operation means a human driver controls the propulsion 40, brake system 42, and steering system 44.

The autonomous-vehicle computer 38 is a microprocessor-based computer. The autonomous-vehicle computer 38 includes a processor, memory, etc. The memory of the autonomous-vehicle computer 38 includes memory for storing instructions executable by the processor as well as for electronically storing data and/or databases.

The autonomous-vehicle computer 38 may transmit and receive data through a communications network 46 such as a controller area network (CAN) bus, Ethernet, WiFi, Local Interconnect Network (LIN), onboard diagnostics connector (OBD-II), and/or by any other wired or wireless communications network. The autonomous-vehicle computer 38 may be communicatively coupled to the propulsion 40, the brake system 42, the steering system 44, sensors 48, the computer 30, and other components via the communications network 46.

The sensors 48 may provide data about operation of the vehicle 36, for example, wheel speed, wheel orientation, and engine and transmission data (e.g., temperature, fuel consumption, etc.). The sensors 48 may detect the location and/or orientation of the vehicle 36. For example, the sensors 48 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 48 may detect the external world, e.g., objects and/or characteristics of surroundings of the vehicle 36, such as other vehicles, road lane markings, traffic lights and/or signs, pedestrians, etc. For example, the sensors 48 may include radar sensors, scanning laser range finders, light detection and ranging (LIDAR) devices, and image processing sensors such as cameras. The sensors 48 may include communications devices, for example, vehicle-to-infrastructure (V2I) or vehicle-to-vehicle (V2V) devices.

Figure 2:
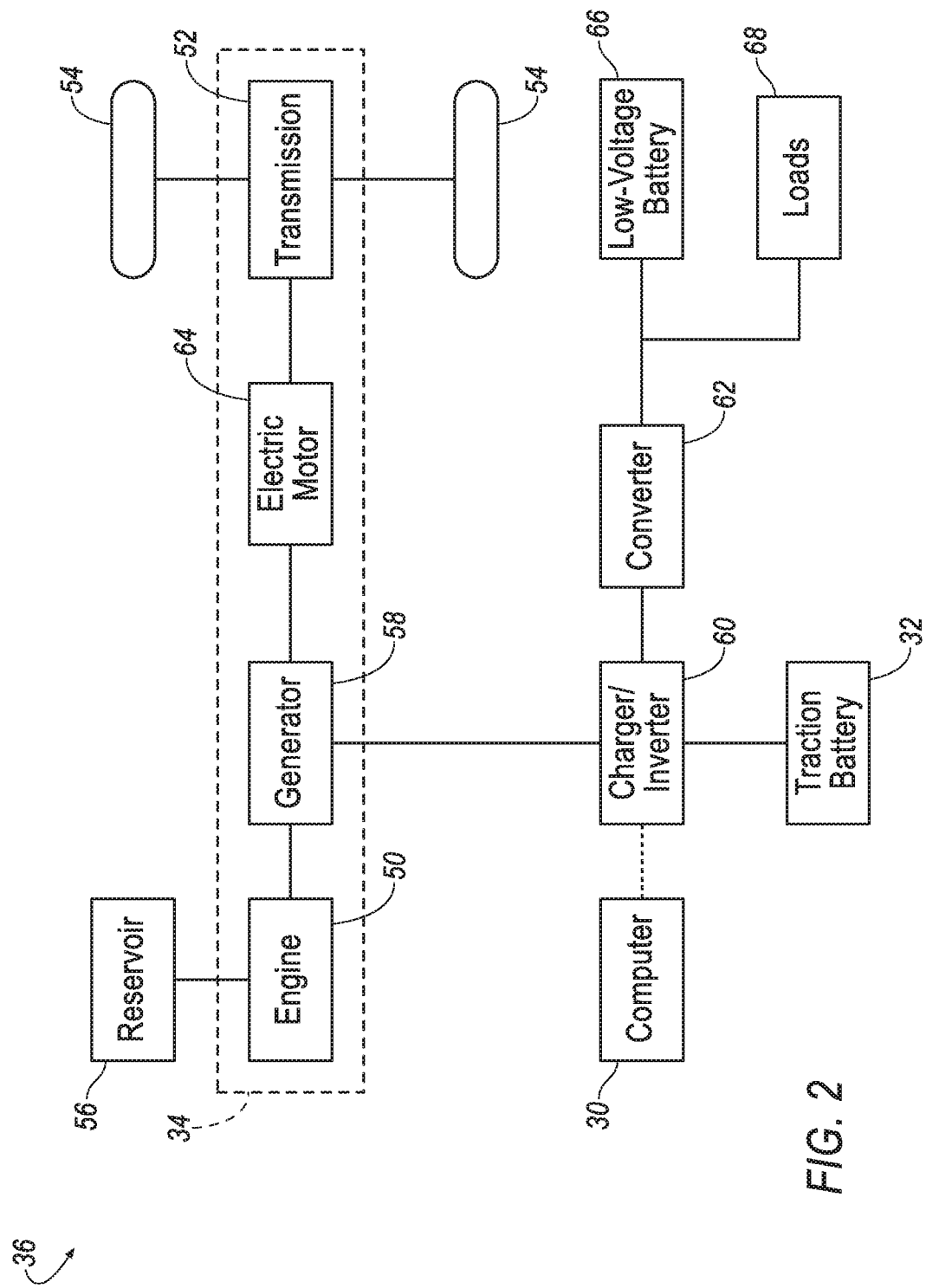
FIG. 2 is a block diagram of an example propulsion of the vehicle of FIG. 1.

The propulsion 40 of the vehicle 36 generates energy and translates the energy into motion of the vehicle 36. In particular, the propulsion 40 may be hybrid propulsion. The propulsion 40 may include the powertrain 34 arranged in any hybrid manner, e.g., a series-hybrid powertrain (as shown in FIG. 2), a parallel-hybrid powertrain, a power-split (series-parallel) hybrid powertrain, etc. The propulsion 40 is described in more detail below with respect to FIG. 2. The propulsion 40 can include an electronic control unit (ECU) or the like that is in communication with and receives input from the autonomous-vehicle computer 38 and/or a human driver. The human driver may control the propulsion 40 via, e.g., an accelerator pedal and/or a gear-shift lever.

The brake system 42 is typically a known vehicle braking subsystem and resists the motion of the vehicle 36 to thereby slow and/or stop the vehicle 36. The brake system 42 may include friction brakes such as disc brakes, drum brakes, band brakes, etc.; regenerative brakes; any other suitable type of brakes; or a combination. The brake system 42 can include an electronic control unit (ECU) or the like that is in communication with and receives input from the autonomous-vehicle computer 38 and/or a human driver. The human driver may control the brake system 42 via, e.g., a brake pedal.

The steering system 44 is typically a known vehicle steering subsystem and controls the turning of wheels 54 of the vehicle 36. The steering system 44 may be a rack-and-pinion system with electric power-assisted steering, a steer-by-wire system, as are both known, or any other suitable system. The steering system 44 can include an electronic control unit (ECU) or the like that is in communication with and receives input from the autonomous-vehicle computer 38 and/or a human driver. The human driver may control the steering system 44 via, e.g., a steering wheel.

The computer 30 is a microprocessor-based computer. The computer 30 includes a processor, memory, etc. The memory of the computer 30 includes memory for storing instructions executable by the processor as well as for electronically storing data and/or databases. The computer 30 may be the same computer as the autonomous-vehicle computer 38, or the computer 30 may be one or more separate computers in communication with the autonomous-vehicle computer 38 via the communications network 46. As a separate computer, the computer 30 may be, e.g., one or more electronic control units or modules (ECU or ECM) such as a hybrid-powertrain control module and/or a battery-energy control module.

With reference to FIG. 2, the propulsion 40 includes the powertrain 34 that transmits power from an engine 50, from the traction battery 32, or from both the engine 50 and the traction battery 32 to a transmission 52 and ultimately to the wheels 54 of the vehicle 36. The engine 50 may be an internal-combustion engine and may contain cylinders that serve as combustion chambers that convert fuel from a reservoir 56 to rotational kinetic energy. A generator 58 may receive the rotational kinetic energy from the engine 50. The generator 58 converts the rotational kinetic energy into electricity, e.g., alternating current, and powers an electric motor 64. A charger/inverter 60 may convert the output of the generator 58, e.g., the alternating current, into high-voltage direct current to supply the traction battery 32 and a converter 62. The high-voltage electricity may be on the order of 400 volts. The converter 62 may be a DC/DC converter, e.g., may receive high-voltage direct current from the charger 60 and/or the traction battery 32 and convert the high-voltage direct current to low-voltage direct current. The low-voltage direct current may be, e.g., 12 volts or 48 volts. The converter 62 may exchange the low-voltage direct current with a low-voltage battery 66, and the converter 62 may supply the low-voltage direct current to loads 68. The loads 68 may include the computer 30 and the autonomous-vehicle computer 38, among other electronics and components of the vehicle 36. The electric motor 64 may convert the electricity from the generator 58 into rotational kinetic energy transmitted to the transmission 52. The transmission 52 transmits the kinetic energy via, e.g., a drive axle to the wheels 54, while applying a gear ratio allowing different tradeoffs between torque and rotational speed.

The traction battery 32 is a high-voltage battery, e.g., on the order of 400 volts. The traction battery 32 may be any type suitable for providing high-voltage electricity for operating the vehicle 36, e.g., lithium-ion, lead-acid, etc.

The charger/inverter 60 controls how much power is supplied from the traction battery 32 to the generator 58 of the powertrain 34 based on commands from the computer 30. For example, the computer 30 may transmit a power limit to the charger/inverter 50 specifying, e.g., a potential difference between the traction battery 32 and the generator 58. A lower power limit, e.g., a lower potential difference, means less power is supplied by the traction battery 32. The computer 30 may prevent the traction battery 32 from discharging power to the generator 58 by transmitting a power limit of substantially zero, i.e., negligibly above zero with respect to the operation of the vehicle 36, to the charger/inverter 50.

Figure 3:
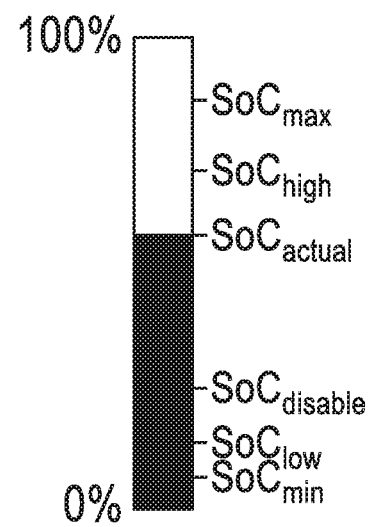
FIG. 3 is a diagram of a state of charge of a traction battery of the power system of FIG. 2.

With reference to FIG. 3, the traction battery 32 has a state of charge $SoC_{actual}$ that can vary between 0% (no remaining charge) and 100% (fully charged). A charge level $SoC_{max}$ is the maximum state of charge to which the traction battery 32 can be charged without damaging the traction battery 32. A charge level $SoC_{min}$ is the minimum state of charge to which the traction battery 32 can be discharged without damaging the traction battery 32. The charge levels $SoC_{max}$ and $SoC_{min}$ are physical characteristics of the traction battery 32 and typically will be specified, e.g., by a supplier of the traction battery 32. A charge level $SoC_{high}$ is a maximum state of charge to which the traction battery 32 will be charged in normal operation. The charge level $SoC_{high}$ may be chosen to provide a safety factor below the charge level $SoC_{max}$. A charge level $SoC_{low}$ is a minimum state of charge to which the traction battery 32 will be discharged in normal operation. The charge level $SoC_{low}$ may be chosen to provide a safety factor above the charge level $SoC_{min}$. A charge level $SoC_{disable}$ will be explained with respect to a process 400 below.

Figure 4:
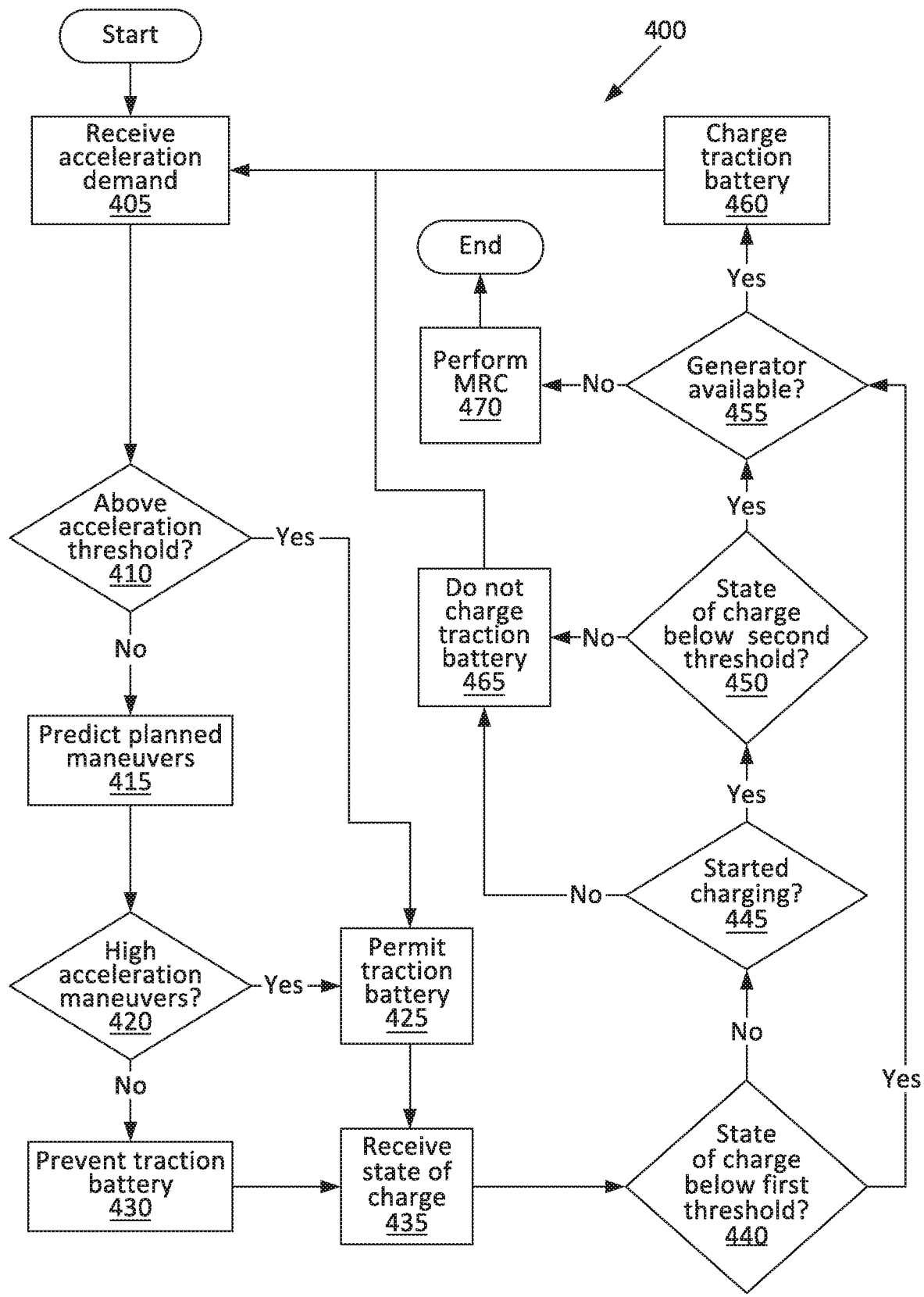
FIG. 4 is a process flow diagram of an example process for controlling the propulsion of FIG. 2.

FIG. 4 is a process flow diagram illustrating an exemplary process 400 for controlling the propulsion 40. The memory of the computer 30 stores executable instructions for performing the steps of the process 400.

In general, blocks 405 to 430 of the process 400 illustrate that the computer 30 is programmed to prevent the traction battery 32 from providing power to the powertrain 34 below a first charge threshold until the computer 30 either receives an acceleration demand above an acceleration threshold or predicts that a planned maneuver classified as high acceleration will occur within a time threshold, and then permit the traction battery 32 to provide power to the powertrain 34 below the first charge threshold. For the purposes of this disclosure, "providing power below a charge threshold" means discharging a battery to a state of charge below the charge threshold. The first charge threshold may be the charge level $SoC_{disable}$. Basically, the traction battery 32 conserves power above at least the charge level $SoC_{disable}$ during normal operation of the vehicle 36 and only provides additional power for events needing higher-than-typical acceleration, as described in more detail below.

The process 400 begins in a block 405, in which the computer 30 receives an acceleration demand. The acceleration demand is any instruction that the vehicle 36 accelerate, i.e., increase speed. The acceleration demand may be a demand for instantaneous acceleration or for, e.g., average acceleration or target speed over a period of time. The acceleration demand may be specified in, e.g., units of acceleration such as meters per second squared ($m/s^2$). The autonomous-vehicle computer 38 may send the acceleration demand to the computer 30. Alternatively, a human driver may send the acceleration demand by, e.g., pressing on the accelerator pedal.

Next, in a decision block 410, the computer 30 determines whether the acceleration demand is above the acceleration threshold. The acceleration threshold may be chosen to be low enough that evasive-driving maneuvers requiring acceleration are typically above the acceleration threshold but most nonevasive driving is below the acceleration threshold. For example, a set of evasive-driving maneuvers may be performed while measuring acceleration on a test track for each type of vehicle 36. If the acceleration demand is above the acceleration threshold, the process 400 proceeds to a block 425.

If the acceleration demand is below the acceleration threshold, next, in a block 415, the computer 30 predicts one or more planned maneuvers for the vehicle 36 within a time threshold. For the purposes of this disclosure, a "planned maneuver" is a driving operation of the vehicle 36 that the autonomous-vehicle computer 38 is planning to perform but has not yet performed. The time threshold may be chosen based on a time horizon over which the autonomous-vehicle computer 38 is capable of planning a planned maneuver, or the time threshold may be chosen based on a time period needed to connect the traction battery 32 to the powertrain 34. The computer 30 may be the same as the autonomous-vehicle computer 38 and therefore predict the planned maneuvers by determining the planned maneuvers according to known autonomous-driving algorithms. Alternatively, the computer 30 may predict the planned maneuvers by receiving the planned maneuvers from the autonomous-vehicle computer 38.

Next, in a decision block 420, the computer 30 determines whether any of the planned maneuvers are classified as high acceleration. A maneuver may be classified as high acceleration based on, e.g., whether the maneuver requires accelerating, e.g., at all or over the acceleration threshold, and must be completed within a short time window, i.e., a time window long enough for the next maneuver that the vehicle 36 will perform. For example, a lookup table may store acceleration minimums and corresponding time-window maximums, and the planned maneuvers are classified as high acceleration if the acceleration of the planned maneuver is higher than one of the acceleration minimums and has a time window lower than the time-window maximum paired with the acceleration minimum.

| Acceleration Minimum ($m/s^2$) | Time-Window Maximum (s) |
|---|---|
| 15 | 2 |
| 17.5 | 1.8 |
| 20 | 1.6 |
| ... | ... |

Alternatively or additionally, maneuvers may be classified as high acceleration based on surveying experienced human drivers about which maneuvers they feel require higherthan-typical acceleration. The high-acceleration maneuvers may be stored in, e.g., a lookup table, such as shown below. A planned maneuver is classified as high acceleration if the planned maneuver is in the table.

| High-Acceleration Maneuvers |
| --- |
| Accelerating on freeway onramp |
| Turning left in front of oncoming vehicle less than 200 feet away |
| Changing lanes to avoid obstacle with trailing vehicle in new lane |
| . . . |

Alternatively to a lookup table, maneuvers may be classified as high acceleration or not with a machine-learning algorithm such as a neural network. The algorithm may be created using known machine-learning techniques using a training set containing maneuvers already classified as high acceleration and not high acceleration, such as by a survey of experienced human drivers. The algorithm may then be able to classify not-already-classified maneuvers during operation of the vehicle 36 according to similarity to high-acceleration or non-high-acceleration maneuvers in the training set. If the planned maneuvers are not high acceleration, the process 400 proceeds to a block 430.

If the acceleration demand is above the acceleration threshold after the decision block 410, or if the planned maneuvers are high acceleration after the decision block 420, in the block 425, the computer 30 permits the traction battery 32 to provide power to the powertrain 34 below the first charge threshold, i.e., the charge level $SoC_{disable}$. For example, the computer 30 may transmit a power limit to the charger/inverter 60 that is ramping down to substantially zero as the state of charge $SoC_{actual}$ of the traction battery 32 approaches the charge level $SoC_{low}$ below the charge level $SoC_{disable}$. The charger/inverter 60 then permits the traction battery 32 to discharge to the generator 58 of the powertrain 34 according to the power limit. The computer 30 may store a first lookup table relating the power limit to the state of charge $SoC_{actual}$ of the traction battery 32. The lookup table may also include other inputs, such as temperature of the traction battery 32, as shown in the example table below.

| | Temperature | | | |
| --- | --- | --- | --- | --- |
| $SoC_{actual}$ | 0° C. | 10° C. | 20° C. | 30° C. |
| 200 V | 175 V | 187 V | 193 V | 196 V |
| 150 V | 125 V | 135 V | 142 V | 147 V |
| 100 V ($SoC_{disable}$) | 85 V | 90 V | 93 V | 98 V |
| 50 V ($SoC_{low}$) | 1.01 V | 1.2 V | 1.3 V | 1.32 V |

The computer 30 may use the state of charge $SoC_{actual}$ and the temperature to look up a power limit and then transmit that power limit to the charger/inverter 60. In the lookup table, as the state of charge $SoC_{actual}$ approaches the charge level $SoC_{low}$, the power limit approaches zero. When the charge level $SoC_{actual}$ is near the charge level $SoC_{disable}$, the power limit is well above zero. After the block 425, the process 400 proceeds to a block 435.

If the planned maneuvers are not high acceleration after the decision block 420, in the block 430, the computer 30 prevents the traction battery 32 from providing power to the powertrain 34. For example, the computer 30 may transmit a power limit to the charger/inverter 60 that is ramping down to substantially zero as the state of charge $SoC_{actual}$ of the traction battery 32 approaches the first charge threshold, i.e., the charge level $SoC_{disable}$. The charger/inverter 60 then permits the traction battery 32 to discharge to the generator 58 of the powertrain 34 according to the power limit. The computer 30 may store a second lookup table relating the power limit to the state of charge $SoC_{actual}$ of the traction battery 32. The lookup table may also include other inputs, such as temperature of the traction battery 32, as shown in the example table below.

| | Temperature | | | |
| --- | --- | --- | --- | --- |
| $SoC_{actual}$ | 0° C. | 10° C. | 20° C. | 30° C. |
| 200 V | 175 V | 187 V | 193 V | 196 V |
| 150 V | 125 V | 135 V | 142 V | 147 V |
| 100 V ($SoC_{disable}$) | 1.01 V | 1.2 V | 1.3 V | 1.32 V |

The computer 30 may use the state of charge $SoC_{actual}$ and the temperature to look up a power limit and then transmit that power limit to the charger/inverter 60. In the lookup table, as the state of charge $SoC_{actual}$ approaches the charge level $SoC_{disable}$, the power limit approaches zero. The traction battery 32 is thus prevented from discharging to a state of charge $SoC_{actual}$ below the charge level $SoC_{disable}$. After the block 430, the process 400 proceeds to the block 435.

In general, in the blocks 435 to 465, the computer 30 begins charging the traction battery 32 after the state of charge $SoC_{actual}$ of the traction battery 32 falls below the first charge threshold and continues charging until the state of charge $SoC_{actual}$ exceeds a second charge threshold. The hysteresis between the first and second charge thresholds prevents the traction battery 32 from switching between charging and discharging too frequently, which may degrade performance over time. The first charge threshold is the charge level $SoC_{disable}$. The charge level $SoC_{disable}$ may be chosen so that sufficient power exists between the charge level $SoC_{disable}$ and the charge level $SoC_{min}$ for the vehicle 36 to perform a high-acceleration maneuver or perform a minimal risk condition (described below with respect to a block 470). The charge level $SoC_{disable}$ is higher than what would be required for a safety factor above the charge level $SoC_{min}$, i.e., is higher than the charge level $SoC_{low}$. The second charge threshold is the charge level $SoC_{high}$; in other words, the second charge threshold is substantially as highly charged as the traction battery 32 can be within normal operation.

After the block 425 or the block 430, in the block 435, the computer 30 determines the state of charge $SoC_{actual}$ of the traction battery 32. The traction battery 32 may include a battery monitoring system or the like, such as is known, for reporting the state of charge $SoC_{actual}$.

Next, in a decision block 440, the computer 30 determines whether the state of charge $SoC_{actual}$ is below the first charge threshold, i.e., the charge level $SoC_{disable}$. If the state of charge $SoC_{actual}$ is below the charge level $SoC_{disable}$, the process 400 proceeds to a decision block 455.

If the state of charge $SoC_{actual}$ is above the charge level $SoC_{disable}$, next, in a decision block 445, the computer 30 determines whether the traction battery 32 is currently in the process of charging. In other words, the computer 30 determines whether the charging has started (as performed in a block 460 below) and has not yet stopped (as performed in a block 465 below). If the traction battery 32 is not currently charging, the process 400 proceeds to the block 465 below.

If the traction battery 32 is currently charging, next, in a decision block 450, the computer 30 determines whether the state of charge $SoC_{actual}$ is below the second charge threshold, i.e., the charge level $SoC_{high}$. If the state of charge $SoC_{actual}$ is above the charge level $SoC_{high}$, the process 400 proceeds to the block 465.

Next, if the state of charge $SoC_{actual}$ is below the charge level $SoC_{high}$, or, after the decision block 445, if the state of charge $SoC_{actual}$ is below the charge level $SoC_{disable}$, in the block 455, the computer 30 determines whether the generator 58 is available, i.e., whether the generator 58 is currently capable of providing sufficient power to both charge the traction battery 32 and continue operating the powertrain 34 of the vehicle 36. The computer 30 may compare the power needed to both charge the traction battery 32 and perform a current maneuver or the planned maneuvers with the power output of the generator 58. The power output of the generator 58 may be determined via conventional means, e.g., by a sensor monitoring the output or by using a prestored value and monitoring if the generator 58 is active, i.e., has not malfunctioned. If the generator 58 is unavailable, the process 400 proceeds to the block 470.

If the generator 58 is available, next, in the block 460, the computer 30 instructs the generator 58, e.g., via the charger 60, to charge the traction battery 32. The generator 58 may start to charge the traction battery 32 or may continue charging the traction battery 32. After the block 460, the process 400 returns to the block 405 for the process 400 to restart.

If the traction battery 32 is not currently charging, after the decision block 445, or if the state of charge $SoC_{actual}$ is above the charge level $SoC_{high}$, after the decision block 450, in the block 465, the computer 30 prevents the generator 58 from charging the traction battery 32. If the generator 58 is currently charging the traction battery 32, the computer 30 instructs the generator 58 to cease charging the traction battery 32. If the generator 58 is not currently charging the traction battery 32, the computer 30 prevents the generator 58 from starting to charge the traction battery 32. After the block 465, the process 400 returns to the block 405 for the process 400 to restart.

If the generator 58 is unavailable, after the decision block 455, in the block 470, the computer 30 instructs the autonomous-vehicle computer 38 of the vehicle 36 to put the vehicle 36 in a minimal risk condition. According to the National Highway Traffic Safety Administration (NHTSA) and the Society of Automotive Engineers (SAE), "'Minimal risk condition' means low-risk operating condition that an automated driving system automatically resorts to either when a system fails or when the human driver fails to respond appropriately to a request to take over the dynamic driving task." For example, the minimal risk condition may be initiating a handover to the human driver or autonomously driving the vehicle 36 to a roadside, i.e., stopping the vehicle 36 outside active lanes of traffic. The autonomous-vehicle computer 38 may perform the minimal risk condition by using known autonomous-operation algorithms. After the block 470, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing processor-executable instructions, the processor programmed to:

prevent a traction battery from providing power to a vehicle powertrain when a state of charge of the traction battery is below a charge threshold;

receive a planned maneuver from an autonomous-driving algorithm, the planned maneuver classified as a high-acceleration maneuver; and then, upon predicting that the planned maneuver will occur within a time threshold, permit the traction battery to provide power to the vehicle powertrain when the state of charge of the traction battery is below the charge threshold;

wherein the memory is storing a lookup table of a plurality of acceleration minimums and a plurality of time-window maximums paired respectively with the acceleration minimums, and the planned maneuver is classified as a high-acceleration maneuver if an acceleration of the planned maneuver is higher than one of the acceleration minimums and a time window for performing the planned maneuver is less than the one of the time-window maximums paired with the one of the acceleration minimums.

2. The computer of claim 1, wherein the processor is further programmed to instruct a generator to charge the traction battery in response to the state of charge of the traction battery falling below the charge threshold.

3. The computer of claim 2, wherein the charge threshold is a first charge threshold, and the processor is further programmed to, after instructing the generator to charge the traction battery, instruct the generator to cease charging the traction battery in response to the state of charge of the traction battery increasing above a second charge threshold.

4. The computer of claim 2, wherein the processor is further programmed to prevent the generator from starting to charge the traction battery in response to the state of charge of the traction battery being above the charge threshold.

5. The computer of claim 1, wherein the processor is further programmed to instruct an autonomous-driving computer of the vehicle to put the vehicle in a minimal risk condition in response to the state of charge of the traction battery falling below the charge threshold and a generator being unavailable.

6. The computer of claim 5, wherein putting the vehicle in a minimal risk condition is driving the vehicle to a roadside.

7. A method comprising:

preventing a traction battery from providing power to a vehicle powertrain when a state of charge of the traction battery is below a charge threshold;

receiving a planned maneuver from an autonomous-driving algorithm, the planned maneuver classified as a high-acceleration maneuver;

then, upon predicting that the planned maneuver will occur within a time threshold, permitting the traction battery to provide power to the vehicle powertrain when the state of charge of the traction battery is below the charge threshold; and storing a lookup table of a plurality of acceleration minimums and a plurality of time-window maximums paired respectively with the acceleration minimums;

wherein the planned maneuver is classified as a high-acceleration maneuver if an acceleration of the planned maneuver is higher than one of the acceleration minimums and a time window for performing the planned maneuver is less than the one of the time-window maximums paired with the one of the acceleration minimums.

8. The method of claim 7, further comprising instructing a generator to charge the traction battery in response to the state of charge of the traction battery falling below the charge threshold.

9. The method of claim 8, wherein the charge threshold is a first charge threshold, the method further comprising, after instructing the generator to charge the traction battery, instructing the generator to cease charging the traction battery in response to the state of charge of the traction battery increasing above a second charge threshold.

10. The method of claim 8, further comprising preventing the generator from starting to charge the traction battery in response to the state of charge of the traction battery being above the charge threshold.

11. The method of claim 7, further comprising instructing an autonomous-driving computer of the vehicle to put the vehicle in a minimal risk condition in response to the state of charge of the traction battery falling below the charge threshold and a generator being unavailable.

12. The method of claim 11, wherein putting the vehicle in a minimal risk condition is driving the vehicle to a roadside.

13. A vehicle comprising:
a vehicle powertrain;
a traction battery electrically coupled to the vehicle powertrain; and
a computer programmed to:
prevent the traction battery from providing power to the vehicle powertrain below when a state of charge of the traction battery is a charge threshold;
receive a planned maneuver from an autonomous-driving algorithm, the planned maneuver classified as a high-acceleration maneuver; and
then, upon predicting that the planned maneuver will occur within a time threshold, permit the traction battery to provide power to the vehicle powertrain when the state of charge of the traction battery is below the charge threshold;
wherein a memory of the computer is storing a lookup table of a plurality of acceleration minimums and a plurality of time-window maximums paired respectively with the acceleration minimums, and the planned maneuver is classified as a high-acceleration maneuver if an acceleration of the planned maneuver is higher than one of the acceleration minimums and a time window for performing the planned maneuver is less than the one of the time-window maximums paired with the one of the acceleration minimums.

14. The vehicle of claim 13, further comprising a generator electrically coupled to the traction battery, wherein the computer is programmed to instruct the generator to charge the traction battery in response to the state of charge of the traction battery falling below the charge threshold.

15. The vehicle of claim 14, wherein the charge threshold is a first charge threshold, and the computer is further programmed to, after instructing the generator to charge the traction battery, instruct the generator to cease charging the traction battery in response to the state of charge of the traction battery increasing above a second charge threshold.

16. The vehicle of claim 14, wherein the computer is further programmed to prevent the generator from starting to charge the traction battery in response to the state of charge of the traction battery being above the charge threshold.

17. The vehicle of claim 13, further comprising a generator electrically coupled to the traction battery, and an autonomous-driving computer communicatively coupled to the computer, wherein the computer is programmed to instruct the autonomous-driving computer to put the vehicle in a minimal risk condition in response to the state of charge of the traction battery falling below the charge threshold and the generator being unavailable.

18. The vehicle of claim 17, wherein putting the vehicle in a minimal risk condition is driving the vehicle to a roadside.

19. The computer of claim 1, wherein the planned maneuver is classified as a high-acceleration maneuver if a type of the planned maneuver is listed in a second lookup table stored in the memory.

* * * * *